L. P. BASSET.
APPARATUS FOR THERMOCHEMICAL GENERATION OF ELECTRICITY.
APPLICATION FILED FEB. 20, 1908. RENEWED APR. 19, 1910.

963,980.

Patented July 12, 1910.

WITNESSES:
Fred White
René Bruine

INVENTOR :
Lucien Paul Basset,
By Attorneys,

UNITED STATES PATENT OFFICE.

LUCIEN PAUL BASSET, OF PARIS, FRANCE, ASSIGNOR TO MAURICE BACQUA DE LABARTHE, OF PARIS, FRANCE.

APPARATUS FOR THERMOCHEMICAL GENERATION OF ELECTRICITY.

963,980.     Specification of Letters Patent.    Patented July 12, 1910.

Original application filed March 27, 1906, Serial No. 308,340. Divided and this application filed February 20, 1908, Serial No. 416,932. Renewed April 19, 1910. Serial No. 556,398.

*To all whom it may concern:*

Be it known that I, LUCIEN PAUL BASSET, a citizen of the Republic of France, residing in Paris, France, have invented certain new and useful Improvements in Apparatus for Thermochemical Generation of Electricity, of which the following is a specification.

The object of this invention is to provide an apparatus for the thermo-chemical generation of electricity in which the calorific energy which becomes free in whatever exothermic reactions occur, is transformed into electrical energy.

The electrolyte is double, and is formed of two solutions, one of which is composed of sulfurous acid added to a dilute solution of sulfuric acid, and the other one of bromin or any other halogen and diluted sulfuric acid. The available energy taken from any source of heat is employed for the regenerating of the electrolytes, which is effected through the heating of the electrolytes which issue out of the containers in which the reactions take place, in order to transform them into their elements.

The vessel, open or closed, into which the electrolytes flow contains electrodes formed preferably of carbon, said electrodes dividing the vessel into as many compartments communicating with one another through branching pipes; which compartments are divided into two parts by means of porous partition walls.

The description which follows, referring to the accompanying drawings, will enable one to understand the particularities of the invention.

Figure 1:
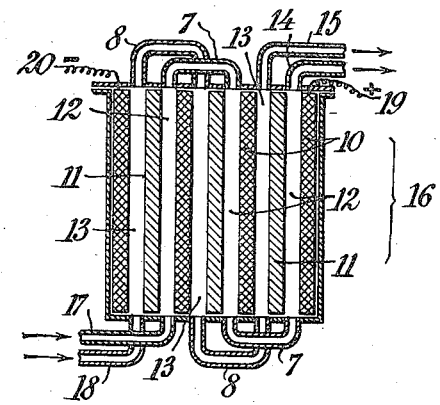
Figure 2:
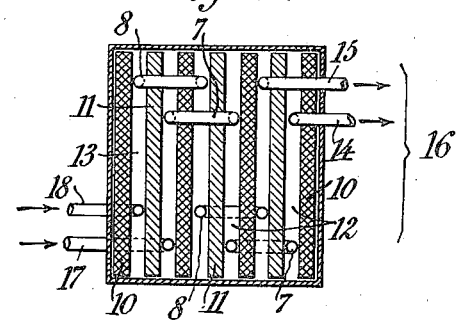
Figure 3:
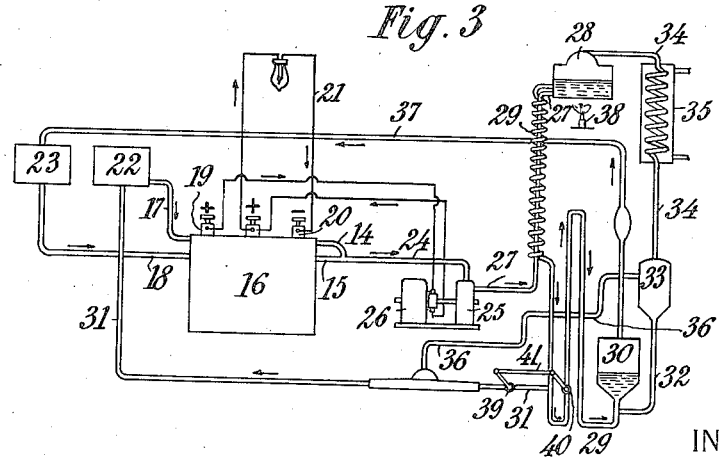

Figures 1 and 2 are respectively a vertical and a horizontal section of a cell. Fig. 3 is a diagram of a complete apparatus, including the regenerating mechanism.

Referring to the embodiment of the invention illustrated, a closed vessel, indicated as a whole by the numeral 16, is divided into a number of compartments by means of electrodes 10 of carbon, each compartment being divided into two parts by a porous partition wall 11. These electrodes and partitions form two groups of compartments 12 and 13, the several compartments 12 being in communication with each other by means of pipes 7, and the several compartments 13 being in communication with each other by pipes 8.

In the compartments 12 the first electrolyte is caused to circulate, composed of sulfurous acid added to a dilute solution of sulfuric acid ($SO_2 + nH_2O + SO_4H_2$), and in the second group of compartments 13 the other electrolyte, $Br_2 + nH_2O + SO_4H_2$. These two electrolytes come into contact by passing through the porous partition 11, and re-act on each other according to the formula,—

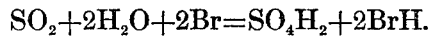

$$SO_2 + 2H_2O + 2Br = SO_4H_2 + 2BrH.$$

In this reaction, due to the presence of the porous partitions, an oxidation of the sulfurous acid is produced so as to form sulfuric acid, and the bromin combines with the hydrogen of the water to form the hydrobromic acid. It is this reaction which produces a current of 0.63 volt which is collected at the terminals 19 and 20.

With the aid of a pump the liquid which comes out of the two groups of compartments is forced through a common passage into a suitable heating apparatus or regenerator in which is produced the decomposition of the hydrobromic acid and sulfuric acid into their elements, bromin, sulfurous acid, and water. The two electrolytes above mentioned containing the bromin and the sulfurous acid come out separately from the regenerator, and the course of the operations is continuous.

Referring to Fig. 3, the battery, which may comprise any number of elements, is indicated at 16. The spaces 12 are in communication with each other so that a liquid entering by pipe 17 flows away by pipe 14 after having traversed all these spaces. In like manner the spaces 13 communicate with each other so that the liquid entering by pipe 18 flows away by pipe 15 after having traversed all these spaces.

The first and the last of the carbon electrodes 10 are respectively connected with the terminals 19 and 20 of an electric circuit 21.

A reservoir 22 in communication with the spaces 12 of the battery 16 through the pipe 17, contains sulfurous acid mixed with a dilute solution of sulfuric acid ($SO_2 + nH_2O + H_2SO_4$). A second reservoir 23 contains bromin and dilute sulfuric acid ($Br_2+nH_2O+H_2SO_4$) and is in communication with the spaces 13 of the battery through the pipe 18. The pipes 14 and 15 for the outflow of the liquids which traverse the spaces 12 and 13 respectively are connected with the same conduit 24 which is attached to the intake of a pump 25 driven by the electric motor 26 in the circuit 21.

The delivery pipe 27 of the pump 26 leads to the lower part of a reservoir 28, and a pipe 29 opening into the middle of the latter is coiled around the pipe 27 and is connected with the lower part of a reservoir 30 and with a pipe 31. The lower part of the reservoir 30 is in communication, by the pipe 32, with the lower part of a chamber 33 the upper part of which is connected by a pipe 34 with the upper part of the reservoir 28; this pipe extends through a refrigerator 35 and is coiled at this part. The upper part of the chamber 33 is also in communication with the pipe 31 through a pipe 36, and the reservoir 30 is in communication with the upper part of the reservoir 23 through a pipe 37. Any source of heat 38 is arranged under the reservoir 28, and cocks 39 and 40, of which the handles are united by a link 41 in order that they may always be operated simultaneously, are adjusted so that as much liquid passes through pipe 31 as through the reservoir 30.

The liquids contained in the reservoirs 22 and 23 pass through spaces 12 and 13 respectively, and, owing to the presence of the porous partitions, the sulfurous acid is oxidized to sulfuric acid, and the bromin combines with the hydrogen of the water to form hydrobromic acid. This chemical reaction may be expressed by the following equation:

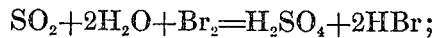

it generates electric current at about 0.63 volt, which is taken off at the terminals 19 and 20.

The solution containing $H_2SO_4+2HBr$ is forwarded by pump 25 through pipe 27 into the reservoir 28. In this latter, under the action of the heat, the sulfuric and hydrobromic acids mutually decompose and yield sulfurous acid and bromin, which escape at the upper part of the said chamber 28 through pipe 34 as gas and vapor respectively. In passing through the coiled part of the pipe 34 the bromin condenses and runs into the reservoir 30 after having traversed the chamber 33, whence the sulfurous acid is directed, by the pipe 36, into an enlargement of the pipe 31. The sulfuric acid in excess remains dissolved in the water which flows from the reservoir 28 by the pipe 29. As the first part of this pipe is coiled around the pipe 27, heat exchange occurs between the liquids which these two pipes contain, so that the liquid in pipe 27 is already heated at the cost of the heat in the pipe 29, before it enters the reservoir 28. The dilute sulfuric acid descending in the pipe 29, separates into two parts; one passes through reservoir 30, into the reservoir 23, and the other into the reservoir 22. Thus the liquid which returns from reservoir 30 into reservoir 23 through pipe 37 has the initial composition $Br_2+nH_2O+H_2SO_4$. On the other hand, the gaseous sulfurous acid passing by pipe 36 into the enlargement of the pipe 31, dissolves in the dilute sulfuric acid with which it comes into contact, so that the liquid which returns to reservoir 22 by pipe 31 has the initial composition $SO_2+nH_2O+H_2SO_4$. In this manner the continuous circulation of the liquids contained in the reservoirs 22 and 23 generates a continuous current of electricity in the circuit 21, in proportion as the heat received by reservoir 28 regenerates the active elements of the battery.

I claim as my invention:—

1. A thermo-chemical generator of electricity comprising a vessel separated into compartments by walls of carbon and walls of porous material alternately disposed, the compartments forming two groups the elements of which are connected with each other alternately, and means for passing two different electrolytes through these two groups of compartments, the walls of carbon constituting also insoluble electrodes.

2. A thermo-chemical generator of electricity comprising a vessel separated into compartments by walls of carbon and walls of porous material alternately disposed, the compartments forming two groups the elements of which are connected with each other alternately, means for passing two different electrolytes through these two groups of compartments, and a regenerating apparatus for restoring the original composition of the electrolytes.

3. A thermo-chemical generator of electricity comprising a vessel separated into compartments by walls of carbon and walls of porous material alternately disposed, the compartments forming two groups the elements of which are connected with each other alternately, means for passing two different electrolytes through these two groups of compartments, a regenerating apparatus for restoring the original composition of the electrolytes, and means for running the two electrolytes from the different compartments together through said regenerating apparatus.

4. A thermo-chemical generator of electricity comprising a vessel separated into compartments by walls of carbon and walls of porous material alternately disposed, the compartments forming two groups the elements of which are connected with each other alternately, two electrolytes one of which is composed of sulfurous acid added to a dilute solution of sulfuric acid, and the other of which is composed of a halogen and diluted sulfuric acid, and means for passing one of the two electrolytes through one of the two groups of compartments and the other electrolyte through the other group.

In witness whereof, I have hereunto signed my name in the presence of two subscribing witnesses.

LUCIEN PAUL BASSET.

Witnesses:
   HANSON C. COXE,
   GABRIEL BELLIARE.